United States Patent
Borkenhagen et al.

(10) Patent No.: US 6,839,816 B2
(45) Date of Patent: Jan. 4, 2005

(54) SHARED CACHE LINE UPDATE MECHANISM

(75) Inventors: John Michael Borkenhagen, Rochester, MN (US); Steven R. Kunkel, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 256 days.

(21) Appl. No.: 10/082,868

(22) Filed: Feb. 26, 2002

(65) Prior Publication Data
US 2003/0163642 A1 Aug. 28, 2003

(51) Int. Cl.[7] .............................................. G06F 12/00
(52) U.S. Cl. ........................ 711/152; 711/138; 711/141
(58) Field of Search ................................. 711/121, 130, 711/146, 152, 151, 141, 138

(56) References Cited

U.S. PATENT DOCUMENTS

| | | | | |
|---|---|---|---|---|
| 5,566,319 A | * | 10/1996 | Lenz | 711/147 |
| 5,611,058 A | * | 3/1997 | Moore et al. | 710/311 |
| 5,895,484 A | * | 4/1999 | Arimilli et al. | 711/118 |
| 5,940,856 A | * | 8/1999 | Arimilli et al. | 711/119 |
| 6,108,757 A | * | 8/2000 | Arshad | 711/152 |
| 6,167,489 A | * | 12/2000 | Bauman et al. | 711/145 |
| 6,477,620 B1 | * | 11/2002 | Bauman et al. | 711/118 |

* cited by examiner

Primary Examiner—Matthew Kim
Assistant Examiner—Hetul Patel
(74) Attorney, Agent, or Firm—Moser, Patterson & Sheridan LLP

(57) ABSTRACT

Embodiments are provided in which cache updating is described for a computer system having at least a first processor and a second processor having a first cache and a second cache, respectively. When the second processor obtains from the first processor a lock to a shared memory region, the first cache pushes to the second cache cache lines for the addresses in the shared memory region accessed by the first processor while the first processor had the lock.

16 Claims, 6 Drawing Sheets

SHARED CACHE LINE UPDATE MECHANISM

BACKGROUND OF THE INVENTION

1. Field of the Invention

The present invention generally relates to cache updating, and more particularly to cache updating in multiprocessor systems.

2. Description of the Related Art

Users of data processing systems continue to demand greater performance for handling increasingly complex and difficult tasks. Greater performance from the processors that operate such systems may be obtained through faster clock speeds so that the individual instructions are processed more quickly. However, processing speed has increased much more quickly than the speed of main memory. As a result, despite the speed of a processor, a bottleneck on computer performance is that of transferring information between the processor and memory. Therefore, cache memories, or caches, are often used in many data processing systems to increase performance in a relatively cost-effective manner.

A typical cache comprises a cache data RAM (Random Access Memory), a cache directory RAM, bus buffers, and a cache controller. The cache data RAM is a small, fast memory which is used to store copies of data which could be accessed more slowly from main memory. The cache size is the number of bytes in the cache data RAM alone. The cache directory RAM contains a list of main memory addresses of data stored in corresponding locations of the cache data RAM. Accordingly, for each cache location, an address and data is stored, making the combined cache directory and cache data RAMs behave like a single, wide memory. The bus buffers are controlled in such a way that if the cache can supply a copy of a main memory location (this is called a cache hit), then the main memory is not allowed to send its data to the requesting CPU. If the cache does not contain a copy of the data requested by the CPU (this is called a cache miss), the bus buffers allow the address issued by the CPU to be sent to the main memory. The cache controller implements the algorithm which moves data into and out of the cache data RAM and the cache directory RAM.

The benefits of a cache are realized whenever the number of cache hits are maximized relative to the number of cache misses. Despite the added overhead that occurs as a result of a cache miss, as long as the percentage of cache hits is high (known as the "hit rate"), the overall processing speed of the system is increased. One method of increasing the hit rate for a cache is to increase the size of the cache. However, cache memory is relatively expensive and is limited by design constraints, particularly if the cache is integrated with a processor on the same physical integrated circuit.

Another method is to chain together multiple caches of varying speeds. A smaller but faster primary cache is chained to a relatively larger but slower secondary cache. Illustratively, some processors implement a small internal level one (L1) cache with an additional external level two (L2) cache, and so on. Furthermore, instructions and data may be separated into separate data and instruction caches.

Shared-memory multiprocessor systems present special issues regarding cache implementation and management. In a shared-memory multiprocessor system, all processors can access the main memory. This enables the tasks on all of the processors to efficiently and easily share data with one another. However, this sharing must be controlled to have predictable results. Conventionally, shared-memory multiprocessor systems have hardware that maintains cache coherency and provide software instructions that can be used to control which processor is storing to a particular memory location.

From the very creation of multiprocessor systems, the sharing of data in main memory has limited the scalability of both hardware and software. That is, it has limited the number of processors that could be effectively used in a multiprocessor system. As the number of processors in a multiprocessor system increases, the problem of limited scalability becomes worse. As a result, efficient hardware and software are needed.

Concerning hardware, most shared-memory multiprocessor systems use a snoop-invalidate cache protocol that allows a processor to store data to a memory location only if it has a modified copy of the cache line associated with the memory location. Other copies in other caches with a matching address are invalidated. This prevents processors from accessing the system bus for every write and maintains cache coherency.

In a shared-memory multiprocessor system, most writes to main memory by a processor modify only the processor's cache. The main memory will be updated with new data only when the modified cache line is evicted from the cache. Moreover, processors usually read data from main memory, operate on the read data, and write the result back to main memory. It is unlikely that a processor writes data to a main memory address and then reads back the data from the same main memory address. Therefore, in a large system with a large number of processors, the next processor to read and/or write to a memory location is often not the processor whose cache has the cache line associated with the memory location. This requires the cache line to be moved between the caches of different processors. Efficiently moving cache lines to other caches (i.e., cache update) is critical to multiprocessor systems.

By way of illustration, on a shared-memory multiple processor system with 16 megabytes of level two (L2) cache per processor, about forty percent of the cache misses are due to reading and/or writing of shared data. Making the cache larger or adding additional levels of cache does not reduce the amount of cache misses. Instead, the result is the percentage of cache misses becomes larger with a larger cache and movement of the cache lines between caches reduces the performance of multiple processor systems.

Accordingly, there is a need for an apparatus and method in which cache updating is effectively carried out for a shared-memory multiprocessor system.

SUMMARY OF THE INVENTION

In one embodiment, a method is provided for cache updating in a computer system including at least a first processor and a second processor having a first cache and a second cache, respectively. The method comprises (a) obtaining, with the first processor, a lock to a shared memory region, (b) accessing, with the first processor, at least a location in the shared memory region, (c) releasing, with the first processor, the lock to the shared memory region, (d) obtaining, with the second processor, the lock from the first processor, and (e) pushing from the first cache to the second cache a cache line for the location without an access by the second processor to the location.

In another embodiment, a computer system comprises at least a first processor and a second processor having a first cache and a second cache, respectively. The first processor is configured to obtain a lock to a shared memory region, access at least a location in the shared memory region, and release the lock. The second processor is configured to obtain the lock from the first processor. The first cache is configured to push to the second cache a cache line for the location, without an access by the second processor to the location.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which cache updating is described for a computer system having at least a first processor and a second processor having a first cache and a second cache, respectively. When the second processor obtains from the first processor a lock to a shared memory region, the first cache pushes to the second cache cache lines for the addresses in the shared memory region accessed by the first processor while the first processor had the lock.

Figure 1:
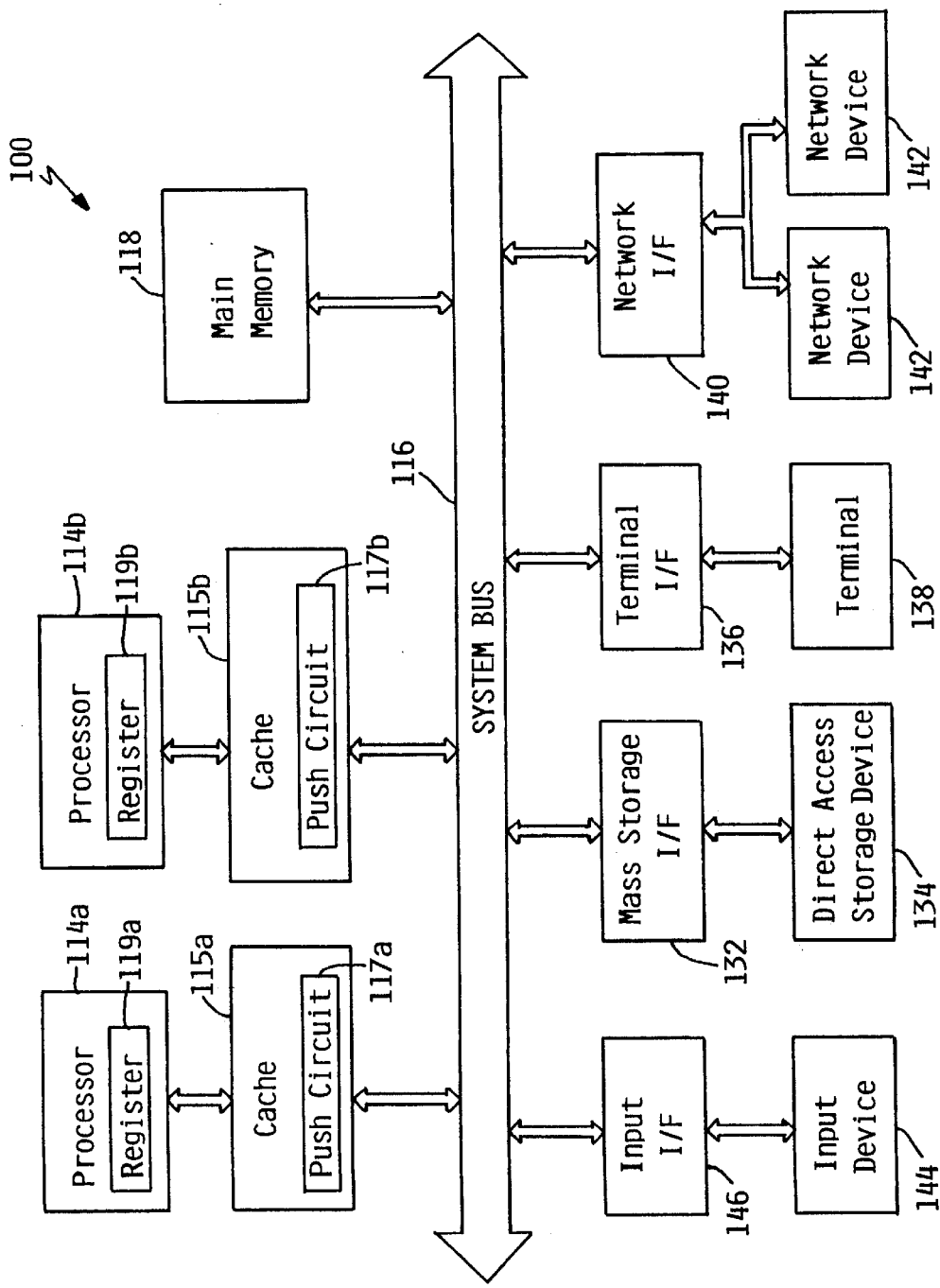
FIG. 1 is a computer system 100 according to an embodiment.

FIG. 1 shows a computer system 100 according to an embodiment. Illustratively, the computer system 100 includes a system bus 116, two processors 114a & 114b (collectively, processors 114) coupled to the system bus 116 via caches 115a & 115b, respectively. In an alternative embodiment, there may be more or less than two processors in the system 100. The two processors 114a & 114b include registers 119a & 119b, respectively. The caches 115a & 115b include push circuits 117a & 117b, respectively. The computer system 100 also includes a main memory 118 coupled to the system bus 116, an input device 144 coupled to system bus 116 via an input interface 146, a storage device 134 coupled to system bus 116 via a mass storage interface 132, a terminal 138 coupled to system bus 116 via a terminal interface 136, and a plurality of networked devices 142 coupled to system bus 116 via a network interface 140.

Terminal 138 is any display device such as a cathode ray tube (CRT) or a plasma screen. Terminal 138 and networked devices 142 may be desktop or PC-based computers, workstations, network terminals, or other networked computer systems. Input device 144 can be any device to give input to the computer system 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processors 114 have a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

Figure 2:
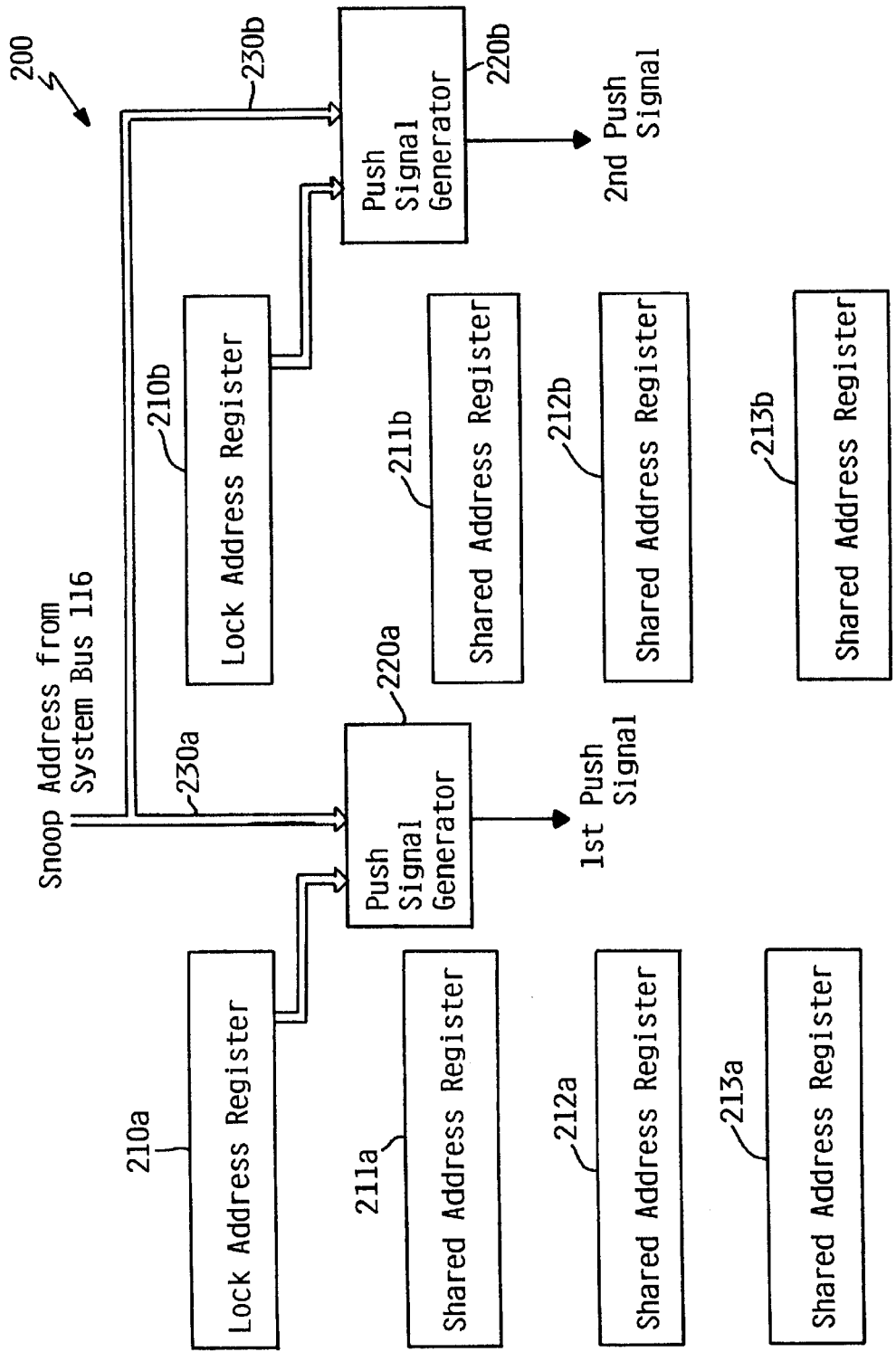
FIG. 2 shows a push circuit 200 as one embodiment of the push circuits 117a & 117b of FIG. 1.

FIG. 2 shows a push circuit 200 as one embodiment of the push circuits 117a & 117b of FIG. 1. The push circuit 200 includes, illustratively, two lock address registers 210a & 210b and six shared address registers 211a, 212a, 213a, 211b, 212b, and 213b. The shared address registers 211a, 212a, and 213a are associated with the lock address register 210a. The shared address registers 211b, 212b, and 213b are associated with the lock address register 210b. In an alternative embodiment, there may be more or less than two lock address registers 210 in the push circuit 200. Also, there may be more or less than three shared address registers 211 associated with each of the lock address registers 210.

Each of the lock address registers 210a & 210b holds a memory address of a lock (semaphore) for controlling access to a certain shared memory region of memory 118. Each of the shared address registers 211a, 212a, 213a, 211b, 212b, and 213b holds a memory address of a memory location accessed (read from or written to) by the respective processor 114.

The push circuit 200 also includes push signal generators 220a & 220b coupled to the lock address registers 210a & 210b, respectively. The push signal generator 220a receives a snoop address via a connection 230a and compares the snoop address with the address in the respective lock address register 210a. If the two addresses match and if the push signal generator 220a is armed, the push signal generator 220a asserts a first push signal. The first push signal being asserted triggers the respective cache 115a to push to another cache (e.g., cache 115b) cache lines whose addresses are stored in the shared address registers 211a, 212a, and 213a. Similarly, the push signal generator 220b receives a snoop address via a connection 230b and compares the snoop address with the address in the respective lock address register 210*b*. If the two addresses match and the push signal generator 220*b* is armed, the push signal generator 220*b* asserts a second push signal. The second push signal being asserted triggers the respective cache 115*a* to push to another cache (e.g., cache 115*b*) cache lines whose addresses are stored in the shared address registers 211*b*, 212*b*, and 213*b*.

Figure 3:
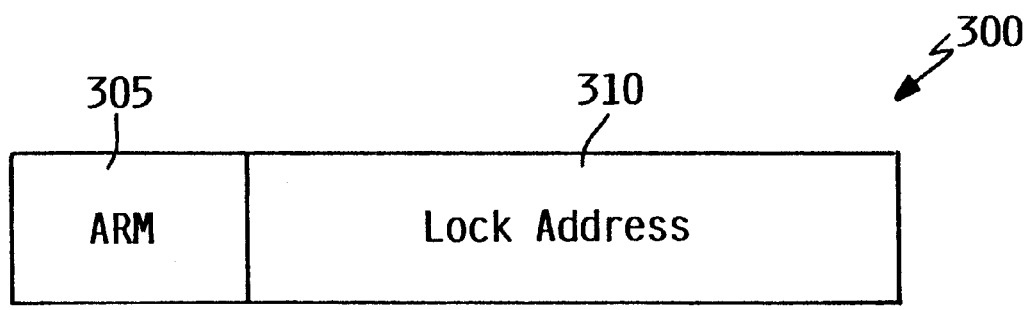
FIG. 3 shows a lock address register 300 as one embodiment of the lock address registers 210a & 210b of FIG. 2.

FIG. 3 shows a lock address register 300 as one embodiment of the lock address registers 210*a* & 210*b* of FIG. 2. Illustratively, the lock address register 300 includes an arm field 305 and a lock address field 310. The lock address field 310 is used to hold a memory address of a lock for controlling access to a shared memory region of memory 118. The content of the arm field 305 indicates whether the respective push signal generator 220 should assert the respective push signal if the address in the lock address field 310 match the snoop address on connection 230.

In one embodiment, the arm field 305 may hold a 0 b (zero binary) or 1 b. If the arm field 305 holds a 1 b, the respective push signal generator 220 is armed and should assert the respective push signal only if the address in the lock address field 310 matches the snoop address on connection 230. If the arm field 305 holds a 0 b, the respective push signal generator 220 is not armed and should deassert the respective push signal, regardless whether the address in the lock address field 310 matches the snoop address on connection 230.

Figure 4:
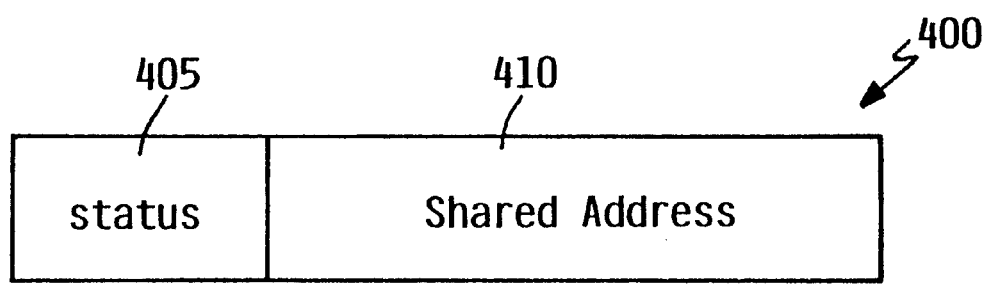
FIG. 4 shows a shared address register 400 as one embodiment of the shared address registers 211a, 212a, 213a, 211b, 212b, and 213b of FIG. 2.

FIG. 4 shows a shared address register 400 as one embodiment of the shared address registers 211*a*, 212*a*, 213*a*, 211*b*, 212*b*, and 213*b* of FIG. 2. Illustratively, the shared address register 400 includes a status field 405 and a shared address field 410. The shared address field 410 is used to hold a memory address of a memory location accessed by the respective processor 114. The content of the status field 405 indicates whether the shared address field 410 currently holds a memory address of a memory location accessed by the respective processor 114 and whether the access is a modifying access (a write).

When the respective push signal is asserted by the respective push signal generator 220, the cache line for the address stored in the shared address field 410 is pushed to the cache of another processor if the content of the status field 405 indicates that the shared address field 410 currently holds a memory address of a memory location accessed by the respective processor 114. For example, assume that the shared address field 410 of the shared address register 211*a* currently holds a memory address of a memory location accessed by the respective processor 114*a*. In this case, the presence of the content in the shared address field 410 will be reflected by the respective status field 405 of the shared address register 211*a*. When a push signal is asserted by the respective push signal generator 220 of the push circuit 117*a*, the cache line for the address stored in the shared address field 410 of the shared address register 211*a* is pushed to the cache of another processor, e.g., the cache 115*b* of the processor 114*b*.

In one embodiment, the status field 405 may contain 0 d (0 decimal), 1 d, or 2 d. If the status field 405 contains 0 d, the content of the shared address field 410 should not be used for any purposes. If the status field 405 contains 1 d, the cache line whose address is in the shared address field 410 should be pushed to another processor 114. If the status field 405 contains 2 d, the cache line whose address is in the shared address field 410 should be pushed to another processor 114 and written to main memory 118.

As an example, assume that a first lock at memory address 10000H is used for controlling access to a first shared memory region in main memory 118 and that a second lock at memory address 20000H is used for controlling access to a second shared memory region in main memory 118. The first and second shared memory regions can be accessed by both the processors 114*a* & 114*b*. In one embodiment, for the first and second locks, assume a lock value of 1 b indicates that the respective shared memory region is being accessed by a processor 114, and a lock value of 0 b indicates that the respective shared memory region is not being accessed by any processor 114.

Assume further that the processor 114*a* needs to access the first shared memory region. The processor 114*a* first reads the content of the first lock from memory address 10000H into its register 119*a* and then writes a 1 b into the first lock. The read from and write to the first lock by the processor 114*a* are atomic, meaning that the first lock cannot be accessed between the read and write by the processor 114*a*. Then, the processor 114*a* examines the content of its register 119*a*. Assume the content of register 119*a* is 0 b, indicating that the processor has obtained the first lock and the first shared region is available for access. In response, the lock address field 310 of the lock address register 210*a* of the push circuit 117*a* is loaded with address 10000H of the first lock. However, the arm field 305 of the lock address register 210*a* of the push circuit 117*a* remains 0 b so that the push signal generator 220*a* is not armed and, as a result, does not assert the first push signal if there is a snoop hit to address 10000H of the first lock.

Assume now that the processor 114*b* also needs to access the first shared memory region. The processor 114*b* first reads the content of the first lock from memory address 10000H into its register 119*b* and then writes a 1 b into the first lock. The read from and write to the first lock by the processor 114*b* are atomic, meaning that the first lock cannot be accessed between the read and write by the processor 114*b*. Then, the processor 114*b* examines the content of its register 119*b*. Because the processor 114*a* had written a 1 b into the first lock when the processor 114*b* read the first lock, the content of register 119*b* is 1 b, indicating that the first shared memory region is not available for access. As a result, the processor 114*b* executes a loop reading from, writing to, and examining the content of the first lock until the first lock is released.

Assume now that the processor 114*a* accesses an address 11000H in the first shared memory region. The address 11000H is loaded into the shared address field 410 of the shared address register 211*a* of the push circuit 117*a*. As a result, the status field 405 of the shared address register 211*a* of the push circuit 117*a* changes accordingly. If the access by the processor 114*a* is a read, the status field 405 of the shared address register 211*a* of the push circuit 117*a* changes from 0 d to 1 d to indicate that the shared address field 410 holds the address of a memory location which the processor 114*a* has read from. If the access by the processor 114*a* is a write, the status field 405 of the shared address register 211*a* of the push circuit 117*a* changes from 0 d to 2 d to indicate that the shared address field 410 holds the address of a memory location which the processor 114*a* has written to.

Assume further that the processor 114*a* accesses an address 12000H in the first shared memory region. The address 12000H is loaded into the shared address field 410 of the shared address register 212*a* of the push circuit 117*a*. As a result, the status field 405 of the shared address register 212*a* of the push circuit 117*a* changes accordingly. That is, if the access by the processor 114*a* is a read, the status field 405 of the shared address register 212*a* of the push circuit 117a changes from 0 d to 1 d. If the access by the processor 114a is a write, the status field 405 of the shared address register 212a of the push circuit 117a changes from 0 d to 2 d.

Assume now that the processor 114a now needs to access the second shared memory region. The processor 114a first reads the content of the second lock from memory address 20000H into its register 119a and then writes a 1 b into the second lock. The read from and write to the second lock by the processor 114a are atomic, meaning that the first lock cannot be accessed between the read and write by the processor 114a. Then, the processor 114a examines the content of its register 119a. Assume the content of register 119a is 0 b, this indicates the second shared region is available for access. In response, the lock address field 310 of the lock address register 210b of the push circuit 117a is loaded with address 20000H of the second lock. However, the arm field 305 of the lock address register 210b of the push circuit 117a remains 0 b so that the push signal generator 220b is not armed and, as a result, does not assert the second push signal if there is a snoop hit to address 20000H of the second lock.

Assume now that the processor 114a accesses an address 21000H in the second shared memory region. The address 21000H is loaded into the shared address field 410 of the shared address register 211b of the push circuit 117a. As a result, the status field 405 of the shared address register 211b of the push circuit 117a changes accordingly. That is, if the access by the processor 114a is a read, the status field 405 of the shared address register 211b of the push circuit 117a changes from 0 d to 1 d to indicate that the shared address field 410 holds the address of a memory location which the processor 114a has read from. If the access by the processor 114a is a write, the status field 405 of the shared address register 211b of the push circuit 117a changes from 0 d to 2 d to indicate that the shared address field 410 holds the address of a memory location which the processor 114a has written to.

Assume now that the processor 114a no longer needs to access the second shared memory region. The processor 114a writes a 0 b into the second lock to release the second lock. In response, the arm field 305 of the lock address register 210b of the push circuit 117a changes from 0 b to 1 b to indicate that the respective push signal generator 220b of the push circuit 117a should assert the second push signal if the address in the lock address field 310 of the lock address register 210b of the push circuit 117a matches the snoop address on connection 230b.

Assume further that the processor 114a now no longer needs to access the first shared memory region. The processor 114a writes a 0 b into the first lock to release the first lock. In response, the arm field 305 of the lock address register 210a of the push circuit 117a changes from 0 b to 1 b to indicate that the respective push signal generator 220a of the push circuit 117a should assert the first push signal if the address in the lock address field 310 of the lock address register 210a of the push circuit 117a matches the snoop address on connection 230a.

As a result of the release of the first lock by processor 114a, the next time the processor 114b reads the content of the first lock at address 10000H, the processor 114b recognizes that the first lock has been released. The processor 114b now can access the first shared memory region. The read by the processor 114b from address 10000H of the first lock also puts the address 10000H as a snoop address on connection 230a of the push circuit 117a. With the arm field 305 of the lock address register 210a of the push circuit 117a containing a 1 b, the read by the processor 114b from address 10000H of the first lock results in a snoop hit which in turn causes the push signal generator 220a of the push circuit 117a to assert the first push signal.

In response to the asserted first push signal, the cache 115a pushes the two cache lines for the two addresses 11000H and 12000H stored in the shared address fields 410 of the shared address registers 211a and 212a, respectively, to the cache 115b of the processor 114b. The cache 115a does not push any cache line to the cache 115b of the processor 114b with respect to the shared address register 213a because the status field 405 of the shared address register 213a contains a 0 d.

The cache 115a also does not push any cache line to the cache 115b of the processor 114b with respect to the lock address register 210b of the push circuit 117a. This is because the processor 114b does not read from the second lock, and as a result, the address 20000H of the second lock does not appear as a snoop address on connection 230b of the push circuit 117a to cause a snoop hit. Therefore, the push circuit generator 220b of the push circuit 117a does not assert the second push signal, and the cache 115a does not push any cache line to the cache 115b of the processor 114b with respect to the lock address register 210b of the push circuit 117a. However, if the second processor 114b later obtains the second lock from the first processor 114a, the cache 115a of the processor 114a pushes to the cache 115b a cache line for the address stored in the shared address register 211b (address 21000H). In general, if any processor 114 other than the first processor 114a later obtains the second lock from the first processor 114a, the cache 115a of the processor 114a pushes to a cache 115 of the other processor 114 a cache line for the address stored in the shared address register 211b (address 21000H).

As a result of the push with respect to the lock address register 210a of the push circuit 117a, two cache lines for the memory addresses 11000H and 12000H are pushed from the cache 115a of processor 114a to the cache 115b of processor 114b. In one embodiment, the two cache lines for the memory addresses 11000H and 12000H in the cache 115a of processor 114a are then marked invalid and the two cache lines for the memory addresses 11000H and 12000H in the cache 115b of processor 114b are marked as Exclusive. Invalid and Exclusive are two of the four MESI (Modify, Exclusive, Shared, and Invalidate) cache line states. If a cache line is in the invalid state, its content should not be used for any purposes. If a cache line is in the Exclusive state, its content Is most current and there is another most current copy in memory 118 and nowhere else. The processor 114b has the pushed data in its cache 115b. As a result, when the processor 114b actually needs to access the pushed data (reading from memory addresses 11000H and 12000H), the pushed data is already in its cache 115b and access time is reduced.

In the example above, assume that the access by the processor 114a to the address 11000H in the first shared memory region was a write. The status field 405 of the shared address register 211a of the push circuit 117a is changed from 0 d to 2 d to indicate that the shared address field 410 of the shared address register 211a of the push circuit 117a holds the address of a memory location which the processor 114a has written to. As a result, the status field 405 containing a 2 d causes the cache 115a to both write the cache line for address 11000H to main memory 118 and push the cache line to the cache 115b of processor 114b.

In the example above, assume that the access by the processor 114a to the address 12000H in the first shared memory region was a read. The status field 405 of the shared address register 212*a* of the push circuit 117*a* is changed from 0 d to 1 d to indicate that the shared address field 410 of the shared address register 212*a* of the push circuit 117*a* holds the address of a memory location which the processor 114*a* has read from. As a result, the status field 405 containing a 1 d causes the cache 115*a* to only push the cache line to the cache 115*b* of processor 114*b* without writing it to the main memory 118.

Figure 5A:
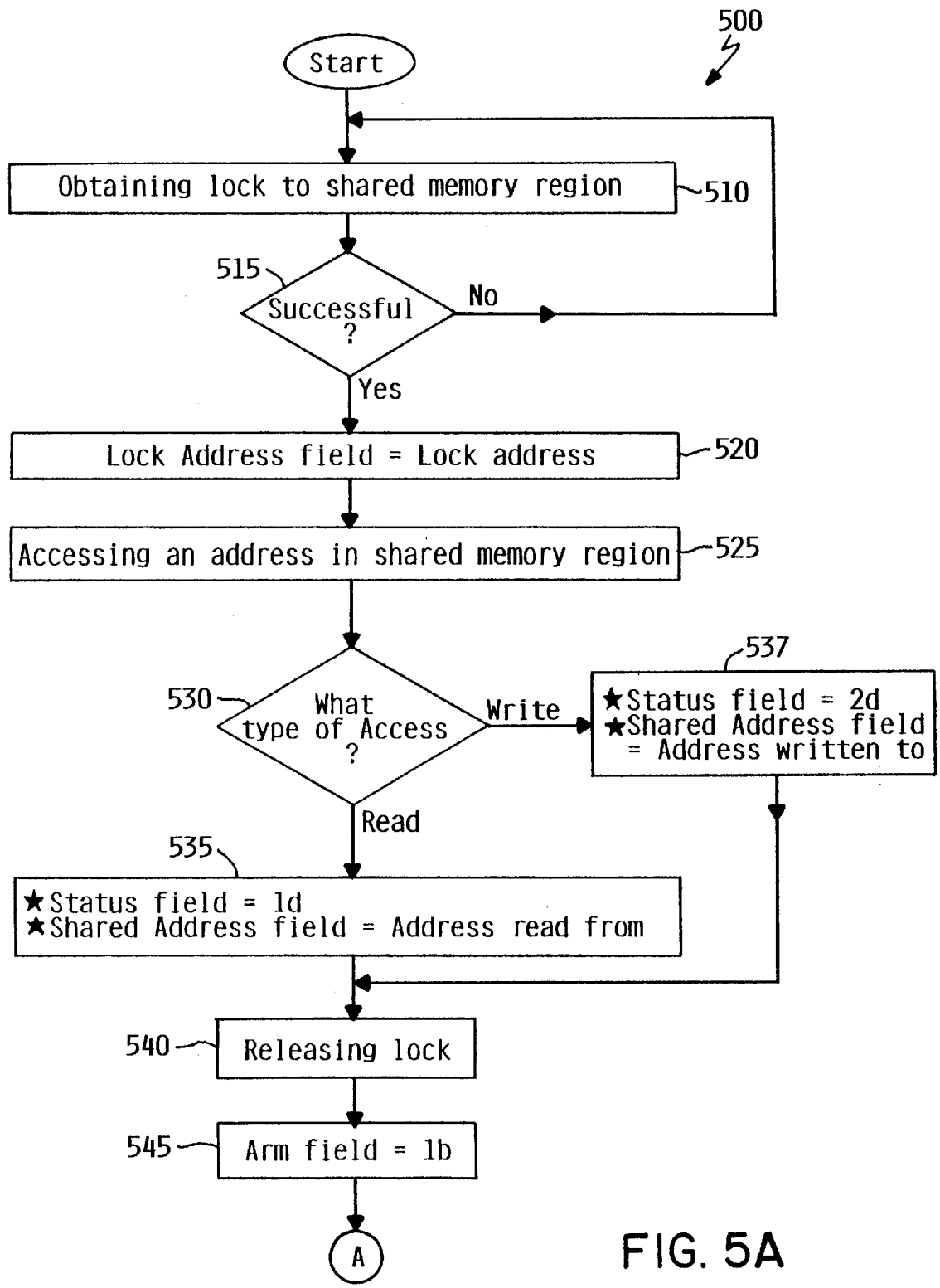
FIG. 5 shows one embodiment of a method of operation 500 for the push circuit 200 of FIG. 2.
Figure 5B:
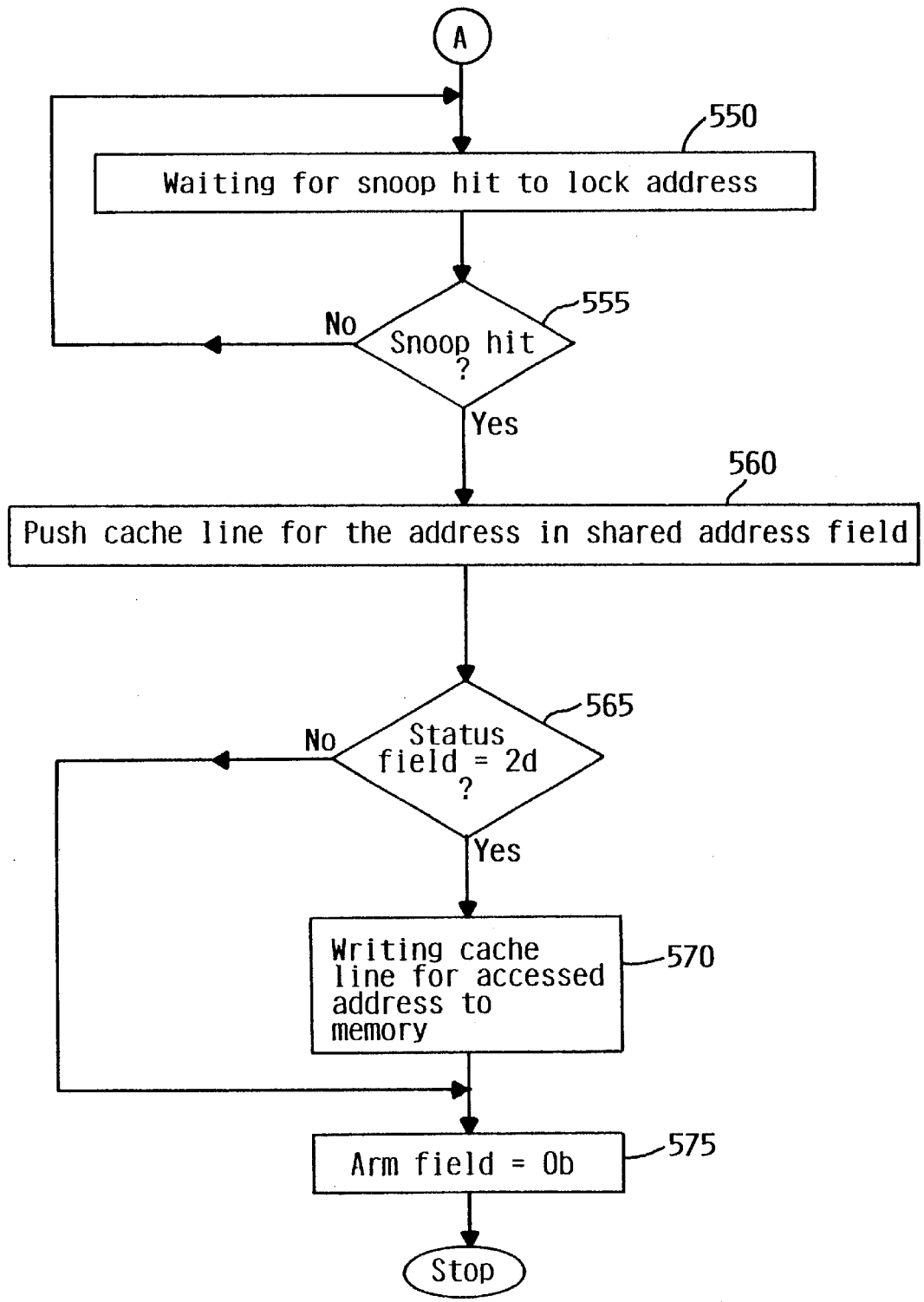

FIG. 5 shows one embodiment of a method of operation 500 for the push circuit 200 of FIG. 2. For simplicity, the method 500 is substantially described with respect to only the lock address register 210*a* and the shared address register 211*a* of the push circuit 200. However, it is understood that the method 500 similarly applies to other lock address registers (e.g., lock address register 210*b*) and other shared address registers (e.g., shared address registers 212*a*, 213*a*, 211*b*, 212*b*, and 213*b*). The method 500 starts at steps 510 and 515 in which a processor 114 attempts to obtain a lock to a shared memory region by repeatedly (a) reading from the lock to the processor's register 119, (b) writing a 1 b to the lock, and (c) examining the content of register 119, until the content of the register 119 contains a 0 b. In other words, when the processor 114 detects a 0 b in its register 119, the processor is successful in obtaining the lock to the shared memory region and becomes the exclusive owner of the shared memory region. After successfully obtaining the lock at step 515, the method 500 proceeds to step 520 where the lock address field 310 of the lock address register 210*a* associated with the lock is loaded with the address of the lock. In step 525, the processor 114 accesses a memory location in the shared memory region. In step 530, a determination is made as to whether the access is a read or a write. If it is a read, in step 535, the status field 405 of the shared address register 211*a* of the push circuit 200 is set to 1 d and the shared address field 410 of the shared address register 211*a* is loaded with the address which the processor 114 reads from. If it is a write, in step 537, the status field 405 of the shared address register 211*a* of the push circuit 200 is set to 2 d and the shared address field 410 of the shared address register 211*a* is loaded with the address which the processor 114 writes to. In step 540, the processor no longer needs to access the shared memory region and releases the lock. In one embodiment, the processor 114 releases the lock by writing a 0 b to the lock. In step 545, the arm field 305 of the lock address register 210*a* is set to 1 b to arm the respective push signal generator 220*a*. In steps 550 and 555, being armed, the push signal generator 220*a* is ready to assert the first push signal if there is a snoop hit to the address of the lock (the address of the lock appears on the system bus 116 and connection 230*a*). When a snoop hit to the lock address occurs, in step 560, the push signal generator 220*a* asserts the first push signal triggering the respective cache 115 to push the cache line for the address stored in the shared address field 410 of the shared address register 211*a* of the push circuit 200. The cache line is pushed to another processor 114 that has put the lock address on the system bus 116 and connection 230*a* causing the snoop hit. The receiving processor of the pushed line now becomes the exclusive owner of the lock. In step 565, a decision is made as to whether the status field 405 of the shared address register 211*a* contains a 2 d. If so, in step 570, the cache line for the address stored in the shared address field 410 of the shared address register 211*a* is written to the memory 118. If not, step 570 is ignored. In step 575, the arm field 305 of the lock address register 210*a* is reset to 0 b so that no more push will occur with respect to the lock address register 210*a*.

In one embodiment, after step 535, if the processor 114 accesses another location in the shared memory region, the shared address register 212*a* associated with the lock address register 210*a* is used to store the other address. The status field 405 of the shared address register 212*a* is set to 1 d if the access is a read and 2 d if a write. If yet another location in the shared memory region is accessed by the processor 114, the shared the shared address register 213*a* associated with the lock address register 210*a* is used, and so on. In one embodiment, if there is no more shared address register to accommodate a new location in the shared memory region accessed by the processor 114, an occupied shared address register will be selected to accommodate the new address. The selection can be based on Round-Robin or Least Recently Used (LRU) methods.

In one embodiment, after step 535, if the processor 114 successfully obtains another lock to another shared memory region, the lock address register 210*b* is used to store the address of the other lock. The shared address registers 211*b*, 212*b*, and 213*b* are used to store addresses in the other shared memory region accessed by the processor 114. The function of the shared address registers 211*b*, 212*b*, and 213*b* with respect to the lock address register 210*b* is the same as that of the shared address registers 211*a*, 212*a*, and 213*a* with respect to the lock address register 210*a*.

In one embodiment, the push circuit 200 includes N lock address registers 210 each of which has P shared address registers. As a result, the push circuit 200 can keep track of N locks to N different shared memory regions which the processor 114 obtains. For each lock, the push circuit can keep track of P different addresses in the respective shared memory region accessed by the processor 114.

Figure 6:
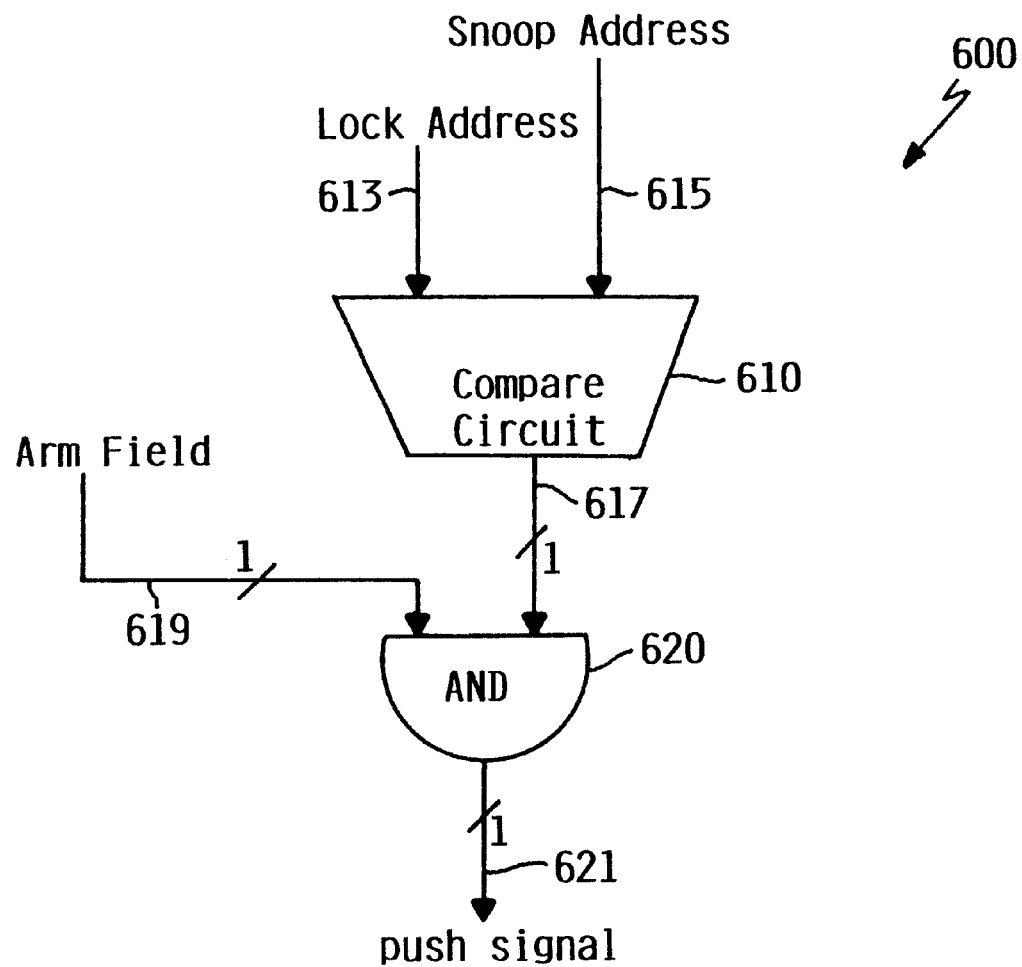
FIG. 6 shows a push signal generator 600 as one embodiment of the push signal generators 220a & 220b of FIG. 2.

FIG. 6 shows a push signal generator 600 as one embodiment of the push signal generators 220*a* & 220*b* of FIG. 2. Illustratively, the push signal generator 600 includes a compare circuit 610 and an AND gate 620. The compare circuit 610 receives as inputs a lock address from a lock address field 310 of a lock address register 300 (FIGS. 2 & 3) via a connection 613 and a snoop address from the connection 230 (FIG. 2) via a connection 615. If the lock address and the snoop address match, the compare circuit 610 generates a signal to the AND gate 620 via a connection 617. The AND gate 620 receives as inputs a bit from the arm field 305 of the respective lock address register 210 via connection 619 and the signal from the compare circuit 610. As a result, if the arm field 305 contains a 1 b and the lock address and the snoop address compare, the AND gate 620 asserts the respective push signal triggering the push of cache lines as described above.

In one embodiment, additional cache control logic for each processor 114 is required to send and accept the pushed cache lines. Pushing the cache lines is equivalent to getting a snoop hit on multiple cache lines. A snoop logic queues up multiple castouts for the single snoop that hits an armed (arm field=1 b) lock address register. The processor 114 that receives the pushed cache lines needs to make room in its cache 115 for the pushed cache lines. In one embodiment, the logic for pushing the cache lines may be the same as the logic for handling cache misses. Cache lines may be selected for replacement based on an algorithm such as Least Recently Used (LRU) and must be cast out (written to memory 118) if they are modified.

In one embodiment, the first processor 114 that first accesses a lock after the lock is released becomes the exclusive owner of the lock. As a result, lock thrashing can be prevented. For instance, the PowerPC instruction set includes the larx (load and reserve) and stcx (store conditionally indexed) instructions. The larx instruction, when executed, loads a cache line and reserves its address by monitoring ownership requests from other processor to the same cache line. The stcx instruction, when executed, conditionally stores (writes) to a cache line. The stcx is successful in storing to the cache line only if the processor executing the stcx instruction obtains the ownership of the cache line before any other processor does (i.e., the larx reservation is still valid). The larx and stcx instructions are used to lock access to shared memory regions. The cache line target of the larx and stcx instructions can hold the value of a lock. A value of 0 b of the lock indicates no processor owns the lock to the respective shared memory region. A value of 1 b of the lock indicates that the respective shared memory region is being accessed. As a result, the larx and stcx instructions can be used to determine if a shared memory region is being accessed. The larx instruction, when executed, also causes hardware to set a reservation register and monitor the larx address to determine if any other processor requests sole ownership of that address. If there is no owner of the lock, a stcx instruction is executed updating the value of the lock to indicate that the lock is owned only if no other processor gets sole ownership of the cache line at the larx address before the store is ready to complete. The stcx instruction also resets the reservation register.

Similarly, the Intel instruction set includes either "compare and exchange" or "fetch and add" semaphore instructions which can be used for locking shared memory regions for updating. In the case of the larx and stcx instructions, if multiple processors are executing a loop waiting for a lock to be released, they all will obtain shared ownership of the lock after the lock is released. The processors then execute a stcx instruction and thrash by knocking each other's reservations preventing all of them from successfully obtaining the lock. This problem does not occur in embodiments described above because once a processor 114 obtains a lock, the processor is the exclusive owner of the lock.

In summary, in the embodiments described above, scaling and performance of the entire system are increased. The embodiments work even when the processors 114 implement multithreading. The embodiments can also be used in NUMA (Non-Uniform Memory Access) systems in which many types of memory devices are used in the memory address space of the system.

Measurement data shows that on a 24 way pSeries S85 system with a 16 MB L2 cache 50% of the L2 cache misses are satisfied by interventions for the TPC-C (Transaction Processing Council-C) workload. Trace analysis has shown that a little over 50% of the use of larx/stcx instructions is for lock acquisition and the other 50% is for atomic updates of memory locations (list insertion, counter increments, etc.). Trace analysis has further shown that some locks have a very high correlation between the locks and the data that is used while holding the locks, and other locks have a very low correlation. There is also a fairly wide range in the number of lines used while holding the lock. Taking all of these together, the performance of the system increases with and without multithreading.

As processor cycle times decrease, this performance gain will further increase because the number of processors in the system increases and the latency for moving data from cache to cache is largely dominated by wire delay, not silicon speed which changes insignificantly over time. In a particular design, the pSeries 690, cache interventions were made as fast as possible so that the performance would be slightly smaller in spite of the higher cycle time. The pSeries S85 and the pSeries 690 systems are both available from International Business Machines, Inc. of Armonk, N.Y.

While the foregoing is directed to embodiments of the present invention, other and further embodiments of the invention may be devised without departing from the basic scope thereof, and the scope thereof is determined by the claims that follow.

What is claimed is:

1. A method for cache updating, comprising:

providing at least a first processor and a second processor having a first cache and a second cache, respectively;

obtaining, with the first processor, a first lock to a first shared memory region;

accessing, with the first processor, at least a first location in the first shared memory region;

placing a cache line for the first location in the first cache;

releasing the first lock with the first processor;

obtaining, with the second processor, the first lock after the first processor releases the first lock;

in response to the second processor obtaining the first lock, pushing from the first cache to the second cache the cache line for the first location without an access by the second processor to the first shared memory region for the first location; and obtaining, with the first processor, a second lock to a second shared memory region after obtaining the first lock and before releasing the first lock by the first processor;

accessing, with the first processor, at least a third location in the second shared memory region;

releasing, with the first processor, the second lock before the first processor releases the first lock;

if the second processor obtains the second lock after the first processor releases the second lock, pushing from the first cache to the second cache a cache line for the third location in response to the second processor obtaining the second lock; and if a third processor obtains the second lock after the first processor releases the second lock, pushing from the first cache to a third cache of the third processor a cache line for the third location in response to the third processor obtaining the second lock.

2. The method of claim 1 wherein:

obtaining, with the first processor, the first lock to the first shared memory region comprises loading a first lock address register with an address of the first lock after the first processor obtains the first lock; and pushing from the first cache to the second cache the cache line for the first location in response to the second processor obtaining the first lock, comprises monitoring, with the first cache, accesses to the first lock and triggering the pushing of the cache line in response to the second processor obtaining the first lock.

3. The method of claim 2, wherein accessing, with the first processor, the first location in the first shared memory region comprises:

providing a first shared address register associated with the first lock address register; and loading the first shared address register with an address of the first location.

4. The method of claim 3, wherein pushing from the first cache to the second cache the cache line for the first location in response to the second processor obtaining the first lock further comprises pushing from the first cache to the second cache a cache line for the address stored in the first shared address register in response to the second processor obtaining the first lock.

5. The method of claim 4, further comprising:
accessing with the first processor, a second location in the first shared memory region after accessing the first location and before releasing the first lock by the first processor; and
pushing from the first cache to the second cache a cache line for the second location in response to the second processor obtaining the first lock.

6. The method of claim 1, further comprising:
accessing, with the first processor, a second location in the first shared memory region after accessing the first location and before releasing the first lock by the first processor; and
pushing from the first cache to the second cache a cache line for the second location in response to the second processor obtaining the first lock.

7. The method of claim 6, wherein accessing, with the first processor, the second location in the first shared memory region comprises:
providing a second shared address register associated with the lock address register; and
loading the second shared address register with an address of the second location.

8. The method of claim 7, wherein pushing from the first cache to the second cache the cache line for the second location in response to the second processor obtaining the first lock comprises pushing from the first cache to the second cache a cache line for the address stored in the second shared address register in response to the second processor obtaining the first lock.

9. A digital system comprising at least a first processor and a second processor having a first cache and a second cache, respectively, wherein:
the first processor is configured to obtain a first lock to a first shared memory region, access at least a first location in the first shared memory region, load a cache line for the first location in the first cache, and release the first lock and to access a second location in the first shared memory region after accessing the first location and before releasing the first lock;
the second processor is configured to obtain the first lock after the first processor releases the first lock;
the first cache is configured to, in response to the second processor obtaining the first lock, push to the second cache the cache line for the first location without an access by the second processor to the first shared memory region for the first location and push to the second cache a cache line for the second location in response to the second processor obtaining the first lock, wherein the first cache further comprises a second shared address register associated with the first lock address register and configured to hold an address of the second location and is further configured to push to the second cache a cache line for the address stored in the second shared address register in response to the second processor obtaining the first lock;
the first processor is further configured to (a) obtain a second lock to a second shared memory region after the first processor obtains the first lock and before the first processor releases the first lock, (b) access at least a third location in the second shared memory region, and (c) release the second lock before the first processor releases the first lock;
if the second processor obtains the second lock after the first processor releases the second lock, the first cache is further configured to push to the second cache a cache line for the third location in response to the second processor obtaining the second lock; and
if a third processor obtains the second lock after the first processor releases the second lock, the first cache is further configured to push to a third cache of the third processor a cache line for the third location in response to the third processor obtaining the second lock.

10. The digital system of claim 9, wherein:
the first cache comprises a first lock address register configured to hold an address of the first lock after the first processor obtains the first lock; and
the first cache is further configured to monitor accesses to the first lock and trigger the pushing of the cache line in response to the second processor obtaining the first lock.

11. The digital system of claim 10, wherein the first cache further comprises a first shared address register associated with the first lock address register and configured to hold an address of the first location.

12. The digital system of claim 11, wherein the first cache is further configured to push to the second cache a cache line for the address stored in the first shared address register in response to the second processor obtaining the first lock.

13. The digital system of claim 12, wherein:
the first processor is further configured to access a second location in the first shared memory region after the first processor accesses the first location and before the first processor releases the first lock; and
the first cache is further configured to push to the second cache a cache line for the second location in response to the second processor obtaining the first lock.

14. The digital system of claim 9, further comprising:
a push circuit configured to assert a push signal in response to detecting the second processor has attempted to obtain the first lock; and
wherein the first cache is configured to push the cache line in response to the asserted push signal.

15. The digital system of claim 14, wherein the push circuit is configured to compare the contents of a lock address register with a lock address requested by the second processor.

16. The digital system of claim 15, wherein the push circuit is configured to assert the push signal only if a signal indicative of the contents of an armed field of the lock address register is asserted.

* * * * *

UNITED STATES PATENT AND TRADEMARK OFFICE
CERTIFICATE OF CORRECTION

PATENT NO.     : 6,839,816 B2
DATED          : January 4, 2005
INVENTOR(S)    : John Michael Borkenhagen and Steven R. Kunkel It is certified that error appears in the above-identified patent and that said Letters Patent is hereby corrected as shown below:

<u>Column 13,</u>
Line 25, "the lock address" should read -- the first lock address --.

Signed and Sealed this

Seventh Day of June, 2005

JON W. DUDAS
*Director of the United States Patent and Trademark Office*